(12) United States Patent
Burgio et al.

(10) Patent No.: US 10,591,939 B2
(45) Date of Patent: *Mar. 17, 2020

(54) VOLTAGE-REGULATOR CIRCUIT, CORRESPONDING ELECTRONIC DEVICE AND METHOD

(71) Applicant: STMicroelectronics S.r.l., Agrate Brianza (IT)

(72) Inventors: Carmelo Burgio, Bergamo (IT); Mauro Giacomini, Bergamo (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 16/161,983

(22) Filed: Oct. 16, 2018

(65) Prior Publication Data
US 2019/0050014 A1 Feb. 14, 2019

Related U.S. Application Data

(63) Continuation of application No. 15/392,823, filed on Dec. 28, 2016, now Pat. No. 10,126,768.

(30) Foreign Application Priority Data

May 16, 2016 (IT) .................. 10201650047

(51) Int. Cl.
| | |
|---|---|
| *G05F 1/575* | (2006.01) |
| *G05F 1/10* | (2006.01) |
| *G05F 1/56* | (2006.01) |
| *H02M 3/158* | (2006.01) |
| *H02M 3/335* | (2006.01) |
| *H02M 1/00* | (2006.01) |

(52) U.S. Cl.
CPC ............... *G05F 1/575* (2013.01); *G05F 1/10* (2013.01); *G05F 1/56* (2013.01); *H02M 3/1584* (2013.01); *H02M 3/33515* (2013.01); *H02M 2001/0045* (2013.01)

(58) Field of Classification Search
CPC .. G05F 1/575; G05F 1/56; G05F 1/10; H02M 3/33515; H02M 3/1584; H02M 2001/0045
USPC ......................................... 327/538, 539, 540
See application file for complete search history.

(56) References Cited

U.S. PATENT DOCUMENTS

| | | | |
|---|---|---|---|
| 4,912,621 A | 3/1990 | Kobayashi et al. | |
| 7,193,454 B1 | 3/2007 | Marinca | |
| 7,612,606 B2* | 11/2009 | Marinca | G05F 3/30 327/539 |
| 8,390,493 B1 | 3/2013 | Raghavan et al. | |

(Continued)

*Primary Examiner* — John W Poos
(74) *Attorney, Agent, or Firm* — Seed Intellectual Property Law Group LLP

(57) ABSTRACT

A voltage-regulator circuit with a current-adder output node for supplying a load with a load current at a regulated output voltage includes an analog portion sensitive to the output voltage and including one or more reference-voltage sources. The analog portion applies to the current-adder node a first current that is a function of the difference between the output voltage and the reference voltage. A digital portion including an integrator is sensitive to the first current. The integrator is coupled to a current source for applying to the current-adder node a second current so that the first current and the second current supply on the current-adder output a load current at the aforesaid regulated output voltage.

21 Claims, 5 Drawing Sheets

(56) References Cited

U.S. PATENT DOCUMENTS 9,201,435 B2 12/2015 Hammerschmidt
2016/0126841 A1 5/2016 Sandrez et al.

* cited by examiner

VOLTAGE-REGULATOR CIRCUIT, CORRESPONDING ELECTRONIC DEVICE AND METHOD

BACKGROUND

Technical Field

The present disclosure relates to voltage regulators. One or more embodiments may find application in the on-chip control of the supply voltage of electronic components, such as those present in digital integrated circuits (e.g., CPUs, memories, timers, etc.).

Description of the Related Art

The current consumption of components like the ones mentioned previously may depend both upon the configuration of the device and upon the operating context (for example, execution of software programs that are different and vary over time, activation/de-activation of peripherals, etc.). This can lead to a variation of the supply voltage, which, instead, should desirably be kept close to a constant and optimal value for operation of the circuits of the device.

The task of guaranteeing that the value of the supply voltage remains within a certain range, for example specified in the design stage, can be entrusted to a feedback loop that can provide an automatic control system.

Notwithstanding the extensive activity of innovation and research in the sector, there is still felt the need to have available regulator-circuit solutions that are improved from various standpoints, both structural and functional.

BRIEF SUMMARY

One embodiment of the present disclosure is directed to a voltage regulator circuit including an output current summing node for supplying a load with a load current at a regulated output voltage. The voltage regulator circuit includes an analog portion sensitive to the output voltage and includes at least one reference voltage source. The analog portion applies to the current summing node at least one first current which is a function of the difference between the output voltage and the reference voltage of the at least one reference voltage source. A digital portion includes an integrator sensitive to the at least one first current. The integrator is coupled to a current source to apply to the current summing node a second current. The at least one first current and the second current provide to the current summing node the load current at the regulated output voltage.

One or more embodiments enable one or more of the following advantages to be achieved:
- possible coexistence of analog control loops (with characteristics of high speed) and digital control loops (which are not as fast but more accurate, with the capacity to manage extensively the current load at the end of the transient phase);
- possibility of controlling numerically also a reference voltage;
- possibility of implementing numeric control strategies, which cannot be implemented in a purely analog context; and
- possibility of implementing safety functions.

According to one embodiment, a voltage regulator circuit includes an output current summing node configured to be coupled to an electric load. An analog control loop circuit is configured to provide an analog current to the output current summing node. The analog current includes a positive analog current and a negative analog current. A digital control loop circuit is configured to provide a digital current to the output current summing node based on an integration of the analog current. The analog current and the digital current collectively form a load current to be supplied to the electric load.

BRIEF DESCRIPTION OF THE SEVERAL VIEWS OF THE DRAWINGS

One or more embodiments will now be described, purely by way of non-limiting example, with reference to the annexed figures, wherein.

DETAILED DESCRIPTION

In the ensuing description, various specific details are illustrated in order to provide an in-depth understanding of various examples of embodiments according to the disclosure. The embodiments may be obtained without one or more of the specific details, or with other methods, components, materials, etc. In other cases, known structures, materials, or operations are not illustrated or described in detail so that the various aspects of the embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in various points of the present description do not necessarily refer exactly to one and the same embodiment. Moreover, particular conformations, structures, or characteristics may be combined in any adequate way in one or more embodiments.

The references used herein are provided merely for convenience and hence do not define the sphere of protection or the scope of the embodiments.

Various electronic devices (such as those exemplified in the introductory part of the present description) may include a control system, which is able to guarantee stability of a supply voltage of the components.

This can be done for example on-chip, i.e., with the above system provided on the device itself, for example according to an analog/continuous-time scheme.

Figure 1:
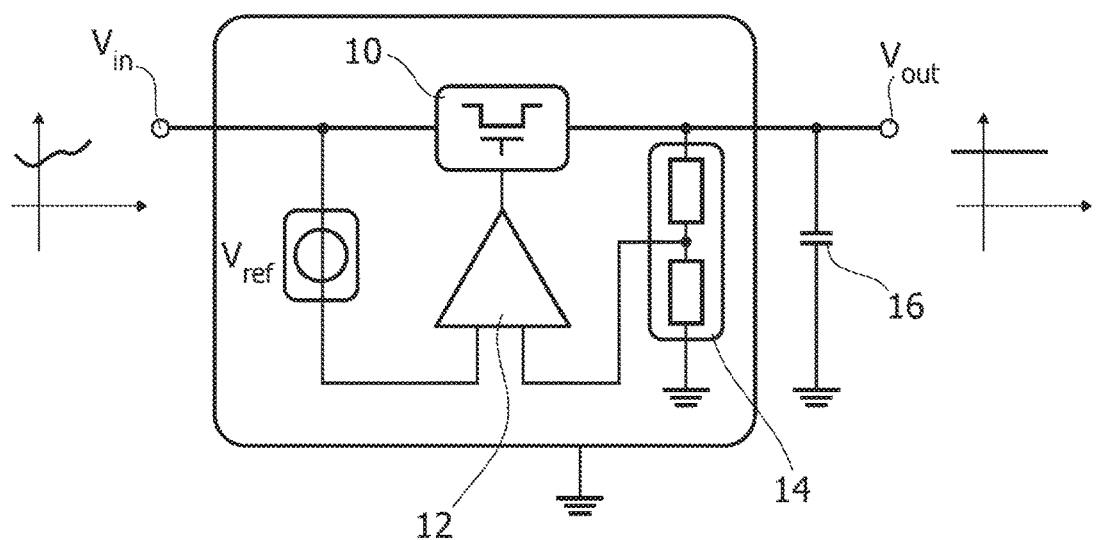
FIG. 1 is a diagram of a linear analog regulator.

An example of such a solution is an analog linear regulator, as exemplified in the diagram of FIG. 1, which is able, starting from an input voltage $V_{in}$, to generate at output a regulated voltage $V_{out}$ that can be applied to a load.

This can be obtained, for example by modulation of the voltage drop across a power stage 10 (for example, a power MOSFET) driven via an error amplifier 12 that senses the difference between a reference voltage $V_{ref}$ and a voltage tapped by a (variable) voltage divider 14 coupled to the output voltage $V_{out}$.

A solution as exemplified in FIG. 1 can facilitate proper operation both in regard to a possible variation of the output load current and in regard to a possible oscillation of the input analog supply voltage $V_{in}$.

The analog linear regulator as exemplified in FIG. 1 may on the other hand require the presence of a stabilization capacitance 16 (which may, for example, be external), which, however, may constitute a weak point of the system in so far as, for reasons of stability of the overall system, the capacitance 16 is chosen with a high value.

In addition to possible problems of encumbrance, this may lead to problems of phase margin on the stability of the closed-loop system. From other standpoints, limiting the value of the aforesaid capacitance may have an adverse effect on the loop gain, with a reduction of the regulating capacity in steady-state conditions: reduction to zero of the error in steady-state conditions would in fact entail creating an ideal integrator in the analog domain.

One or more embodiments may provide a solution such as to lead to the simultaneous presence of a number of control loops, both analog and digital.

Analog control systems are fast, but may not be sufficiently precise, whereas a digital or numeric control system may be slower, but may manifest, at the end of the transient phase, the capacity of managing (virtually all) the current load.

A numeric system can likewise control also a reference voltage and/or enable implementation of non-conventional numeric control strategies, which cannot be implemented in a purely analog context, with the added possibility of managing safety functions.

Figure 2:
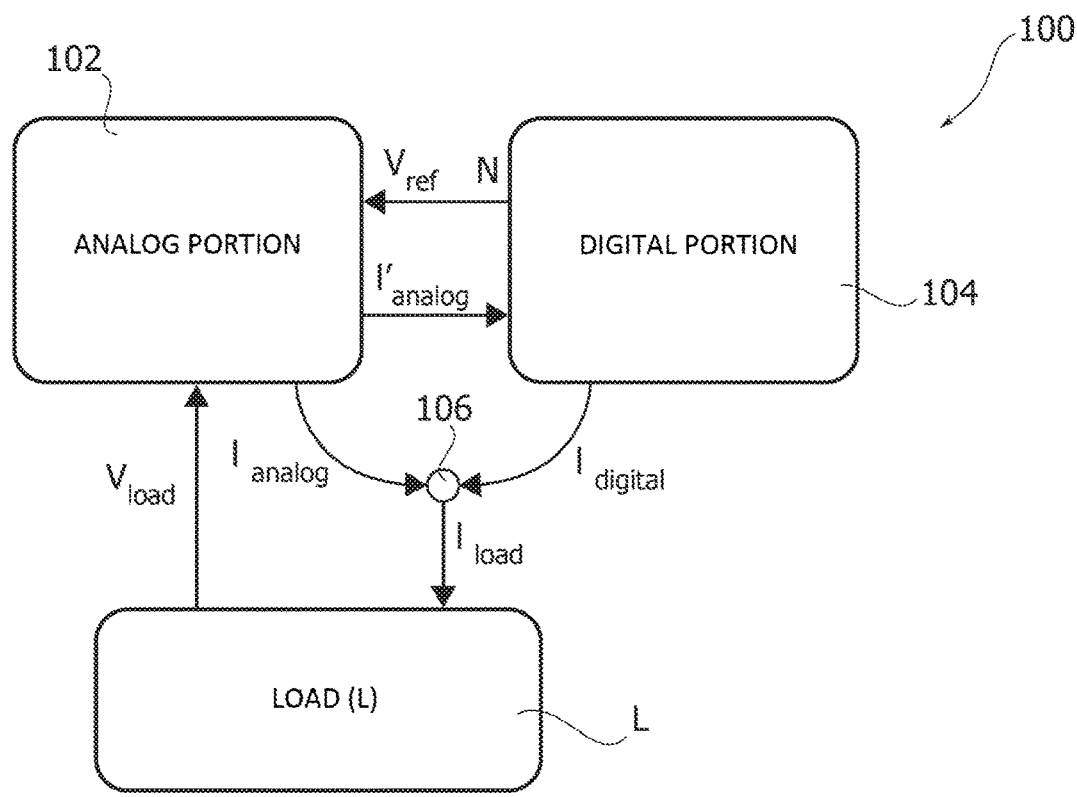
FIG. 2 is a functional block diagram of a regulation system one or more embodiments of the present disclosure.

Exemplified in the block diagram of FIG. 2 is a function of the control system 100, which can co-operate with a load L that in general may be assumed as being variable. It will on the other hand be appreciated that the load L may in itself be a separate element with respect to the embodiments.

In one or more embodiments, the control system 100 may comprise an analog part or portion (for example, a linear one) 102 and a numeric or digital part or portion (for example, a non-linear one) 104.

In one or more embodiments, the control system 100 can determine the value of the current $I_{load}$ to be supplied to the load L (variable in a way that is not known) with the aim of keeping the voltage $V_{load}$ on the load L itself constant.

Following upon a variation of the current absorbed by the load L (which, for simplicity of understanding, may be imagined as a step variation) the load L tends in fact to modify the voltage $V_{load}$ across it.

In these conditions, the analog portion 102 can respond (in a fast way) by modifying a first component $I_{analog}$ of the current supplied to the load L through an adder node 106.

At the same time, information $I_{analog}$ regarding the current component supplied by the analog portion 102 can be sent to the digital portion 104.

The digital portion 104, which may comprise an ideal integrator, can start to apply a respective current component $I_{digital}$ to the adder node 106, which generates the current $I_{load}$ of the load L as the sum of the component $I_{analog}$ of the analog portion 102 and of the component $I_{digital}$ of the digital portion 104, with the analog portion 102 that reduces by an equal amount its contribution so that—at the end of a transient period—the current $I_{load}$ to the load L can chiefly be supplied, with a high degree of precision, by the digital control portion 104.

In one or more embodiments, as discussed in what follows, the digital portion (controller) 104 can regulate at least one reference voltage, for example $V_{ref}N$ of the analog portion 102.

Figure 3:
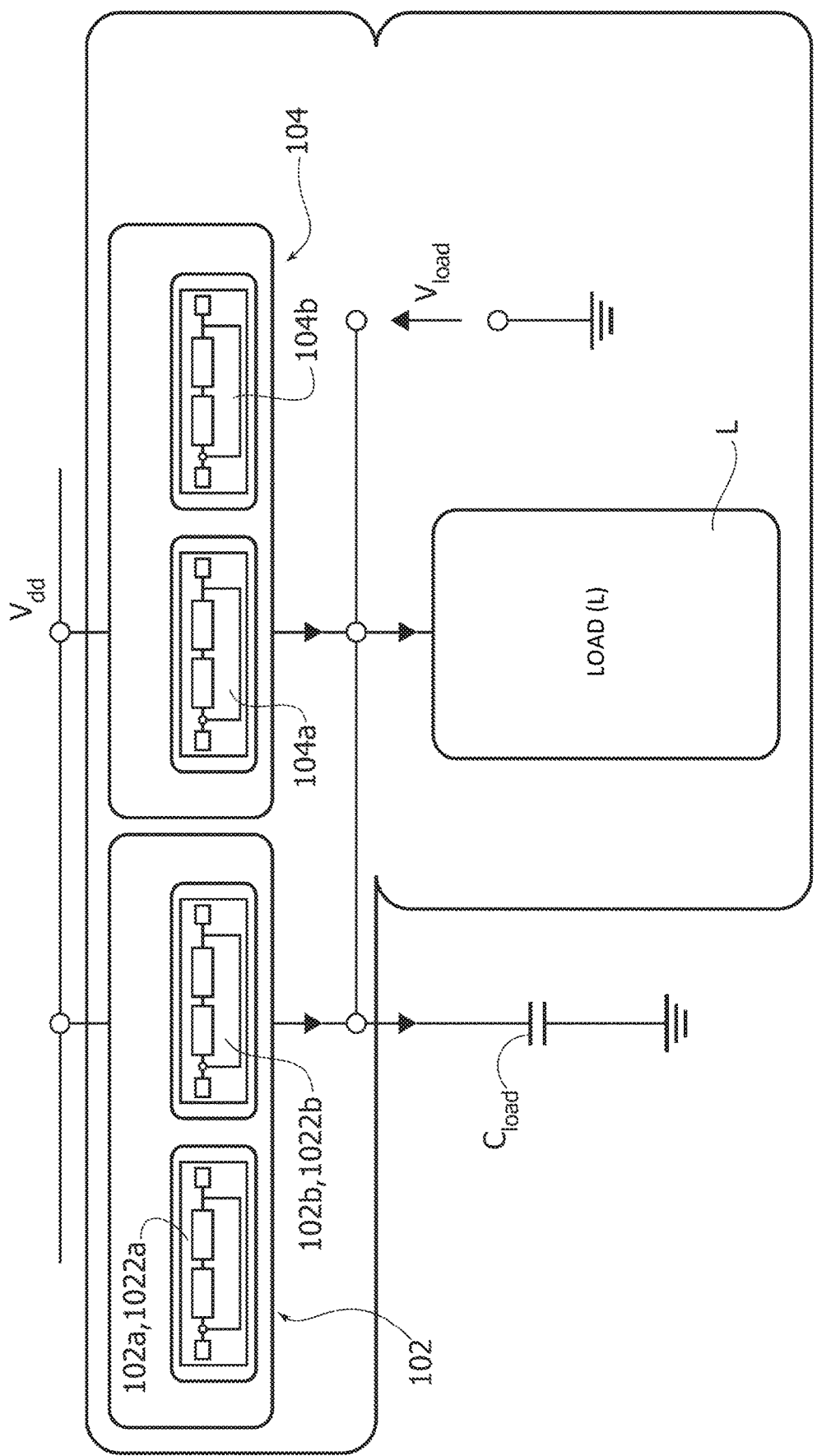
FIG. 3 is a diagram of a regulation system according to one embodiment of the present disclosure.

In one or more embodiments, a system according to the general scheme of FIG. 2 may be implemented, as exemplified in FIG. 3, with:
- the analog portion 102 comprising two analog regulation loops 102a, 1022a; 102b, 1002b; and
- the digital portion 104 comprising two modules 104a, 104b, which may also be configured on the basis of digital regulation loops.

In one or more embodiments, the aforesaid elements can be coupled to a supply voltage Vdd.

In one or more embodiments, the analog loops may comprise two current generators (for example, 1022a and 1022b in FIG. 4) that charge or discharge an external compensation capacitance $C_{load}$ (which may be chosen with a reduced value), thus regulating the voltage $V_{out}$ on the load upwards or downwards.

In one or more embodiments, the digital or numeric portion may be configured so as to control a current generator and the reference voltage, respectively, of one of the two analog loops.

In one or more embodiments, the digital portion 104, comprising the modules 104a and 104b, may also have available the information on the currents, denoted, respectively, by $I_p$ and $I_n$, supplied by the analog loops (sources 1022a and 1022b with $I_p+I_n=I_{analog}$), with the aim of containing intervention of these two loops (i.e., the current contribution $I_p$ and $I_n$) and ideally supplying, in steady-state conditions, all the current necessary, the aim likewise being to reduce as far as possible the power dissipated by the analog generators.

The load L exemplified in FIG. 3 may be constituted, for example, by a microcontroller (μC).

Figure 4:
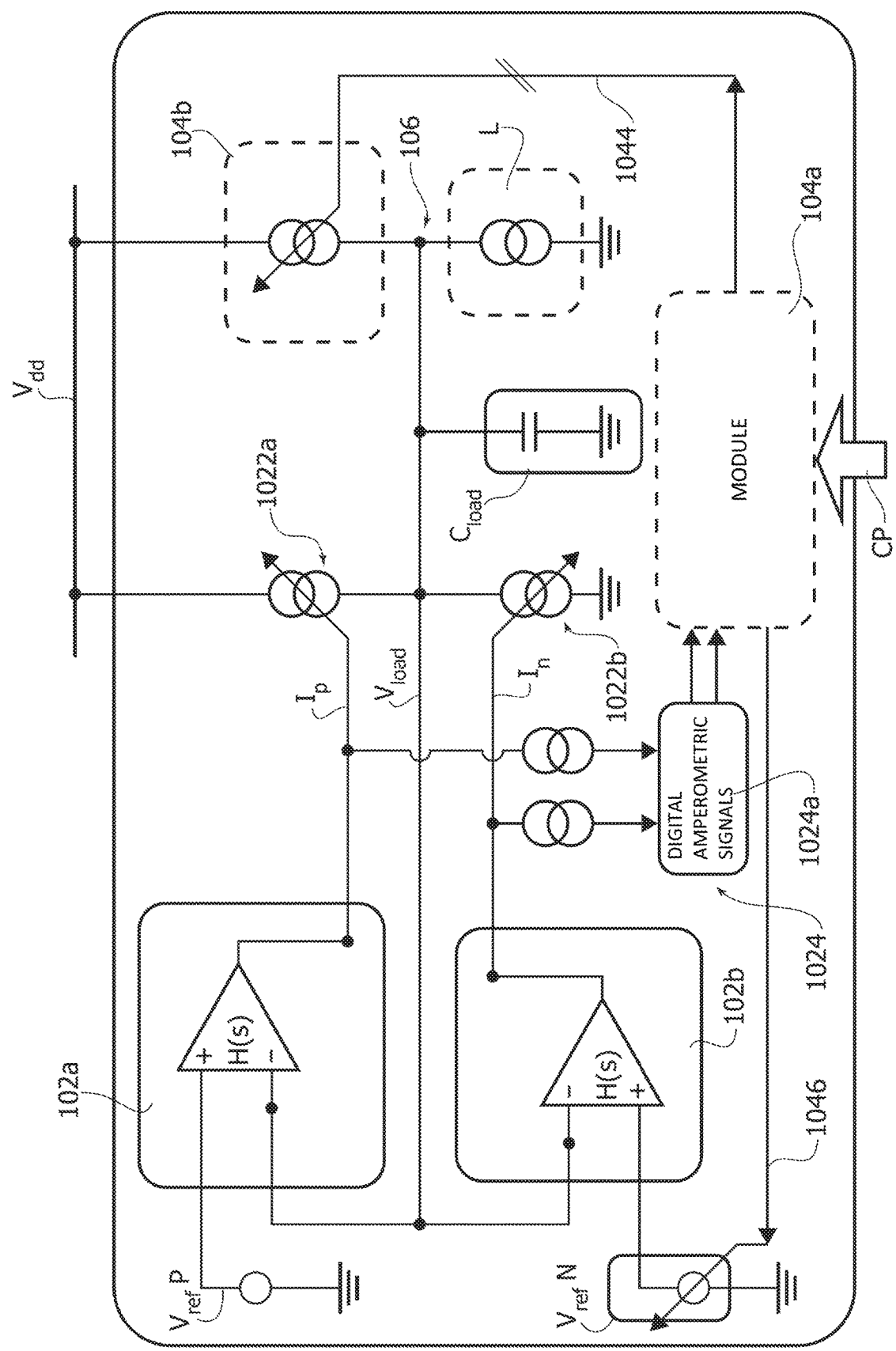
FIG. 4 is a corresponding circuit diagram according to one embodiment of the present disclosure.

As exemplified in FIG. 4, the two loops of the analog portion 102 may comprise two differential stages 102a, 102b, which receive on an input (for example, a non-inverting input) the voltages generated by two reference sources $V_{ref}P$ and $V_{ref}N$, with the other inputs (for example, inverting inputs) of the stages 102a, 102b sensitive to the output voltage $V_{out}$.

The outputs of the two differential stages 102a, 102b, fed back on the aforesaid other inputs (for example, inverting inputs), can drive respective generators, i.e., current sources 1022a, 1022b (which may be implemented, for example, as current mirrors) for generating precisely the currents $I_p$ and $I_n$ that are to be fed to the adder node 106 together with the current $I_{digital}$ coming from a digitally driven current source 104b for providing supply of the load L. It will be noted that both the current source 104b and the load L are schematically represented with a dashed line in FIG. 4 in order to facilitate understanding of the possible connections. This also applies to driving, on a line 1044, of the source 104b, which may comprise a digital-to-analog (D/A) converter for converting into analog format the digital driving signal received on the line 1044.

The voltage on the adder node 106 represents the (regulated) output voltage $V_{out}$ present across the capacitor $C_{load}$.

The reference 1024 as a whole designates an amperometric sensor assembly or block that is able to detect the intensity of the currents $I_p$ and $I_n$ (i.e., the current $I_{analog}$ of the scheme of FIG. 2), sending corresponding signals—converted into digital format in 1024a—to the loop or module 104a of the digital portion, which is also schematically represented with a dashed line in FIG. 4 in order to facilitate understanding of the possible connections.

Assuming that the load current L undergoes a change, such as a change that may arise following upon a modification in the system (for example, a variation of the state of the microcontroller considered as possible example of load L), initially the task of maintaining at the reference value $V_{load}$ the voltage across the compensation capacitor $C_{load}$ can be entrusted to the analog loops 102a, 1022a; 102b, 1022b, which may be wide-band, and hence faster, loops.

For instance, with reference to FIG. 4:
if there emerges a tendency to a reduction of the regulated voltage $V_{out}$, the "positive" loop 102a, 1022a may intervene by applying current towards the node 106, hence towards the load L, thus tending to raise the voltage on the capacitor $C_{comp}$;
if there emerges a tendency to an increase of the regulated voltage $V_{out}$, the "negative" loop 102b, 1022b may intervene by applying a current in the opposite direction, hence starting from the node 106, i.e., by removing current from the connection towards the load L, thus tending to reduce the voltage on the capacitor $C_{comp}$.

In one or more embodiments, the digital portion 104 may be configured so as to provide control of two components:
the source 104b that is connected to the node 106 at the regulated voltage $V_{out}$; this may occur, for example, via the line 1044; and
the reference voltage of at least one of the stages 102a, 102b, for example the reference voltage $V_{ref}$N of the "negative" stage 102b; this may be obtained, for example, via a line 1046.

In one or more embodiments, the digital portion 104 may receive (via the amperometric sensor block 1024) the information on the intensity of the currents $I_p$ and $I_n$ supplied by the sources 1022a and 1022b. In one or more embodiments, these two currents may have only a zero or positive value, according to the state of activation of the generators.

Starting (for example, exclusively) from this information, the digital portion 104 may intervene so as to bring the system "asymptotically" into conditions where:
the current contribution $I_{analog}=I_p+I_n$ supplied by the analog loops 1022a, 1022b is reduced, thus causing the current of the load L to be for the most part supplied by the numerically controlled generator, i.e., by the source 104b; and
the currents $I_p$ and $I_n$ have, in steady-state conditions, a value that is as low as possible, for example aiming at obtaining a reduction in the current dissipated by simultaneous activation of the sources 1022a and 1022b, albeit without it being brought to zero.

One or more embodiments may draw advantage from the fact that a numeric control, unlike an analog system, is able to provide a practically ideal integrator (for example, with a simple accumulator).

In the context considered here, this may mean that, in steady-state conditions, the regulation error on the voltage $V_{load}$ may be rendered to virtually zero.

Figure 5:
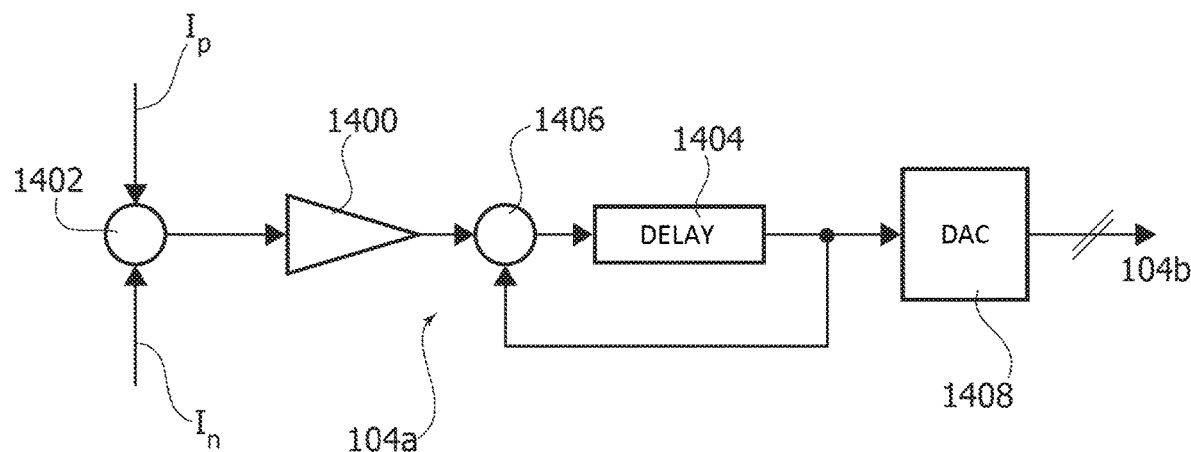
FIG. 5 is a diagram of a numeric loop integrator according to one embodiment of the present disclosure.

For instance, the current values $I_p$ and $I_n$ read by the amperometric sensor block 1024 of FIG. 4 enable (for example, by flowing into a node 1402) application of a (digital) input to an integrator as seen in FIG. 5, which is likewise digital, comprising an input stage 1400 with gain G, as well as a delay 1404 with accumulation function, i.e., with the delay 1404 supplied by an adder node 1406 that adds the output of the stage 1400 to the output of the delay 1404, fed back at input.

In one or more embodiments, the node 1402 may in effect correspond to a table (for example, a look-up table, LUT), which, as a function of the input signals $I_p$ and $I_n$ (digitized in the analog-to-digital converter stage 1024a), selects a corresponding value to be applied to the digital integrator.

In this way, it is possible to cause the loop gain of the system not to be constant, but to vary as a function of the current measured. In this way, a nonlinear control strategy is applied, which facilitates improvement of the speed of response of the system.

For instance, by increasing or reducing the value of integration of the integrator 1400, 1404, 1406 it is possible to control, for example by means of a digital-to-analog converter 1408, a current generator (for example, the source 104b of FIG. 4), which is able to bring the voltage $V_{load}$ back to the reference value.

In this way, it is also possible to enable, simultaneously and automatically, the analog loops 102a, 1022a; 102b, 1022b to limit (and virtually annul) their contribution to control of the voltage itself.

In one or more embodiments, the choice of the gain 1400 and of the delay 1404 may correspond to the introduction of configuration parameters CP of the digital portion (see, for example, FIG. 4).

In one or more embodiments, the "numeric" current source 104b may comprise, instead of a single current source, a multiplicity (even hundreds) of individual entities capable of supplying unit or elementary currents (so to speak, current "quanta" of known amount).

Figure 6:
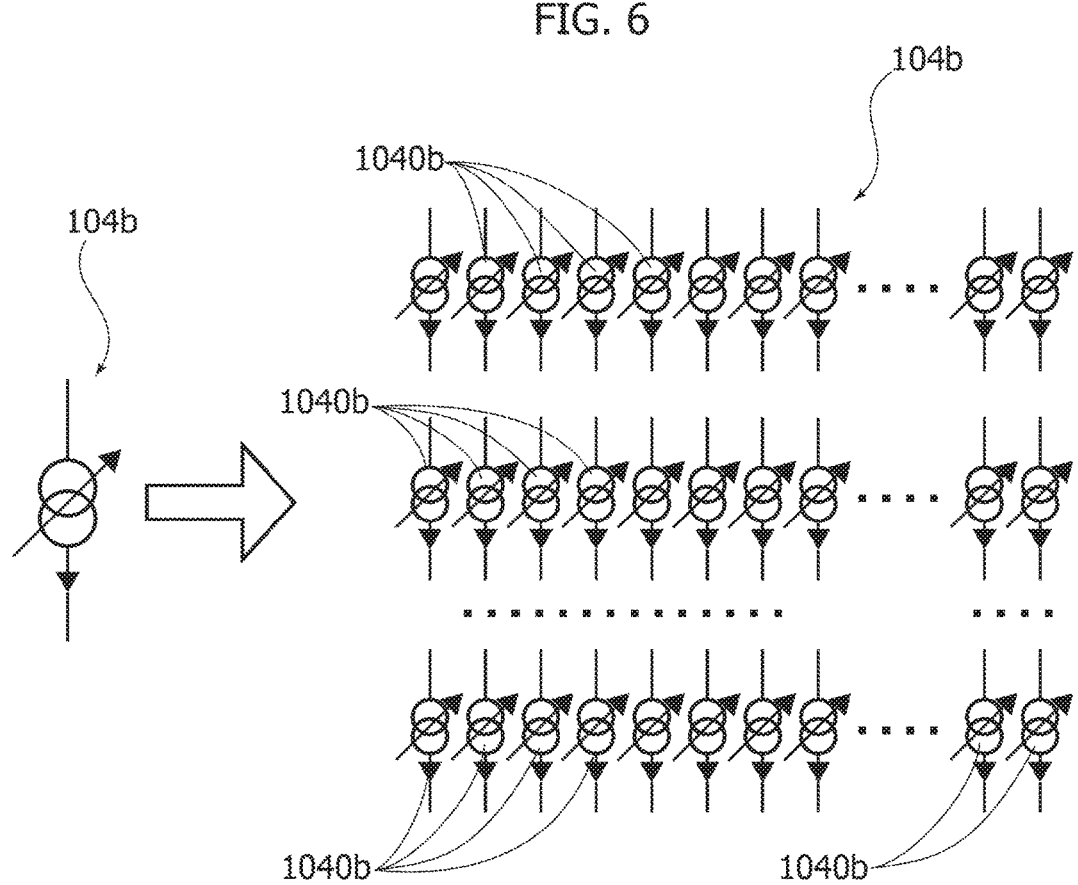
FIGS. 6 and 7 exemplify a possible organization of a numerically controlled current generator and control of the active sources according to one embodiment of the present disclosure.

The diagram of FIG. 6 exemplifies a possible organization of such a digital-control current generator, where each contribution or "quantum" of current 1040b can be controlled by a respective command having the purpose of activating/deactivating the corresponding current, which for simplicity may be assumed as being of the same intensity for each contribution.

In one or more embodiments, the sources 1040b may be distributed within the device homogeneously, and all together they add their current contribution on the capacitor $C_{comp}$ in order to regulate the voltage $V_{load}$.

In one or more embodiments, a possible logic of activation/deactivation of the sources 1040b may be the following:
the sources 1040b are activated in a discrete way, selectively creating pools of sources each time active, enabling, at each clock cycle, just one source to be entered into/removed from the pool of active sources;
over time, all the sources 1040b are activated by turns;
no source 1040b is kept constantly active; and
the sources 1040b present the same average activation time.

Figure 7:
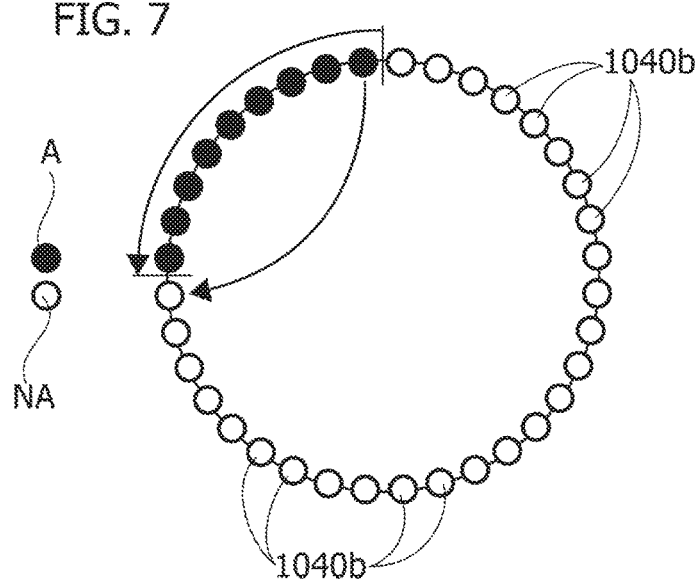

FIG. 7 exemplifies how the above criteria can be represented imagining the sources 1040b as being set on a loop made up of as many elements as are the sources 1040b.

These elements may assume two states:
A: "active/ON" (full circle in FIG. 7); and
NA: "non-active/OFF" (empty circle in FIG. 7),
where these states correspond to activation or de-activation of the corresponding unit current source.

In one or more embodiments, the number of the elementary sources 1040b in the active or ON state can thus determine the number of active unit sources and hence the current contribution $I_{digital}$ supplied to the load. At each clock cycle, it is possible to imagine that the sequence of ON elements advances by one position, thus guaranteeing uniformity of activation of the elements over time.

In one or more embodiments, it is possible to vary in time the number of elements, for example following upon a control signal coming from the integrator of FIG. 5. This signal may determine, for example, an increase/reduction by one unit of the number of active elements.

In one or more embodiments, a corresponding control logic of the source 104b can be organized in a distributed way, in the sense that each control element can act independently, without the need to resort to a centralized control in so far as proper behavior can be facilitated even just thanks to observation by the individual elements of some simple rules.

For instance, in one or more embodiments, by observing the state of two adjacent elements, each element can identify its own position from among four possible positions (see once again the graphic representation of FIG. 7):
- "leading" position in the section of active elements (just one possible position);
- "internal" position in the section of active elements (a number of possible positions);
- "trailing" position in the section of active elements (just one possible position);
- "external" position with respect to the section of active elements (a number of possible positions).

In one or more embodiments, shifting "forwards" by one position the section of active elements may determine a situation where, at each clock cycle:
a) the element in front of the "leading" one is activated (NA→A); and
b) the "trailing" element is deactivated (A→NA).

In one or more embodiments, to increase/reduce the number of active elements, it may be sufficient at each clock cycle simply not to carry out step b) or step a), respectively.

One or more embodiments may enable handling of "fault" events, where by the term "fault" is meant erroneous switching of a memory element (for example, a flip/flop).

One or more embodiments may enable, in this case, detection of the event and its possible neutralization.

Examining now, for simplicity of explanation, the case where there is just one "fault" at each clock cycle, an erroneous switching of an element could lead to a situation where in the circular diagram or loop of FIG. 7 two leading elements and two trailing elements are present. In this case, detection of the fault may be automatic and immediate, it moreover being possible to proceed to removal of the state of error by simply activating/deactivating the element that is active/non-active, while the adjacent elements are in an opposite condition.

In one or more embodiments, the numeric-control portion 104 may also have the task of regulating the value of (at least) one of the reference voltages, for example, $V_{ref}N$ in FIG. 4.

In one or more embodiments, the regulation may, for instance, aim at causing:
- absence of simultaneously active sources for the current $I_p$ and for the current $I_n$ (so as to prevent any useless power consumption); and/or
- simultaneous de-activation of all the sources of the currents $I_p$ and $I_n$ (which could lead to a condition of the system not being under control).

In one or more embodiments, this regulation may, for example, aim at regulating the value of the reference voltage $V_{ref}N$ by keeping it as close as possible to the value $V_{ref}P$, aiming at preventing a continuous conduction between $I_p$ and $I_n$.

Figure 9:
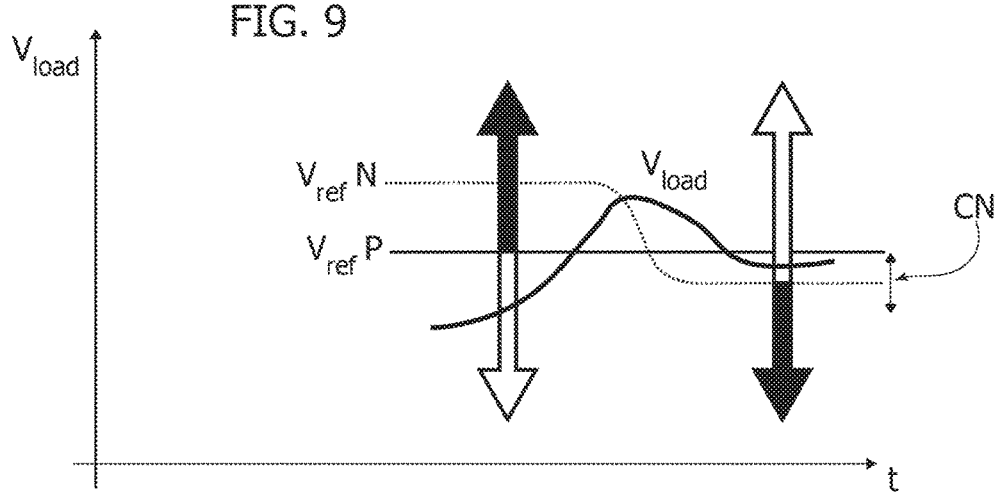

As illustrated in the diagram of FIG. 9, as an example of a way of operating in this sense, it may be assumed that initially the voltage $V_{ref}N$ has a value higher than $V_{ref}P$, and is then brought by the feedback loop to a value close to $V_{ref}P$.

At this point, a step that can be defined as "contentious" starts, in which a point of dynamic equilibrium is pursued, for example with the control loops associated with $V_{ref}P$ and $V_{ref}N$ activated alternately in order to maintain the voltage $V_{ref}N$ at a value such as to guarantee equilibrium.

Figure 8:
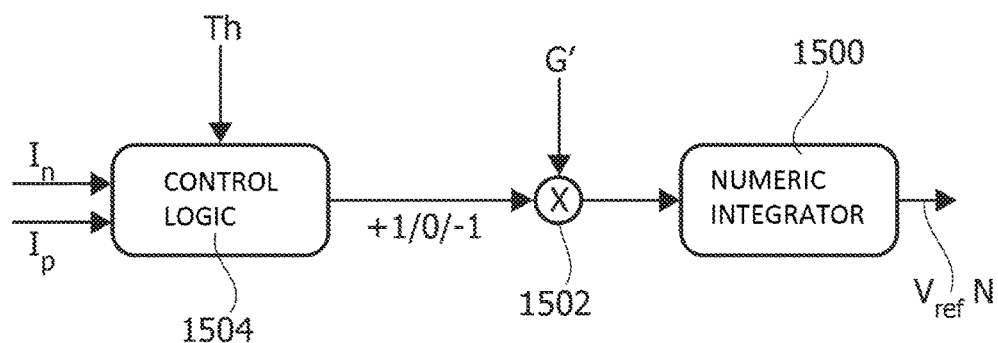
FIG. 8 and FIG. 9 show a circuit diagram and a diagram, which exemplify a possible control function in one or more embodiments of the present disclosure.

For instance, in one or more embodiments, as exemplified in FIG. 8, control of the voltage $V_{ref}N$ may be obtained by means of a numeric integrator 1500, the input of which may correspond to a parameter G' (in practice, it is the loop gain) that defines the speed of reaction thereof (i.e., the speed of variation of $V_{ref}N$).

The sign (or setting to zero of the value effectively applied to the integrator 1500) may be determined, via a multiplication node 1502, by means of a control logic 1504 sensitive to the values of $I_p$ and $I_n$ (supplied by the amperometric block or module 1024) of respective thresholds, which in effect can be identified with just one threshold Th.

If only one of the two is above the defined threshold, $V_{ref}N$ remains unvaried. This condition corresponds to a "normal" situation so that there is no need to alter $V_{ref}N$: the input to the integrator 1500 is hence zero (multiplication factor of the node 1502 equal to 0).

Otherwise, selection of the sign of the multiplication (multiplication factor of the node 1502 equal to −1 or +1) may be made, for example, according to the level of $I_n$.

In fact, values of $I_p$ and $I_n$ that are both above the threshold may correspond to a useless power consumption, so that $V_{ref}N$ may increase, thus reducing the contribution of the corresponding loop N (1022b), with the loop P (1022a) that adapts accordingly.

If, instead, the levels $I_p$ and $I_n$ are both too low (i.e., close to the condition of dead zone of the two regulators, which, in practice, is equivalent to saying that neither of the two regulators is active to an appreciable extent), $V_{ref}N$ can diminish, with the current of the loop N that increases and the loop P that adapts accordingly.

In one or more embodiments, the system can operate without having any knowledge of the real value of $V_{ref}N$; the value of $V_{load}$ can be controlled by the loop P and have as target value $V_{ref}P$, while the loop of $V_{ref}N$ operates in such a way as to keep the two regulators out of the dead zone, reducing the power dissipation linked to simultaneous activation of $I_p$ and $I_n$.

The two double-headed arrows of FIG. 9 exemplify the conditions of activation (substantially "crossed" or "diametral") of the generators 1022a and 1022b that generate the currents $I_p$ and $I_n$.

In particular:
- in the arrow on the left, the light part at the bottom and the dark part at the top exemplify, respectively, activation and deactivation of the generator 1022a (current $I_p$); and
- in the arrow on the right, the dark part at the bottom and the light part at the top exemplify, respectively, deactivation and activation of the generator 1022b (current $I_n$).

From FIG. 9 it will be appreciated that intervention of the numeric control CN may be such as to cause the "tails" of the light arrows on the right and on the left to cross at a certain height, this being an indication of the presence of a small (but not necessarily zero) interval of activation of both of the loops P and N.

One or more embodiments may hence regard a voltage-regulator circuit, comprising a current-adder node (for example, 106) for supplying a load (for example, L) with a load current (for example, $I_{load}$) at a regulated output voltage (for example, $V_{load}$).

In one or more embodiments, such a circuit may comprise:
- an analog portion (for example, 102) sensitive (for example, 102a, 102b) to the output voltage and comprising at least one reference-voltage source (for example, $V_{ref}P$, $V_{ref}N$), the analog portion applying (for example, via the generators 1022a, 1022b) to the current-adder node at least one first current (for example, $I_{analog}$, $I_p$, $I_n$) that is a function of the difference between the output voltage and the reference voltage of the at least one reference-voltage source; and
- a digital portion (for example, 104) comprising an integrator (for example, 1400, 1404, 1406) sensitive to (see, for example, $I'_{analog}$) and optionally operating on (see, for example, the node 1402 of FIG. 5) the at least one first current, the integrator being coupled to a current source (for example, 104b) for applying to the current-adder node a second current (for example, $I_{digital}$), which is a function of the integration of the first current, so that the at least one first current and the second current supply on the current-adder node output a load current at the regulated output voltage.

In this way, the analog portion can perform initially, in a fast way, the action of regulation, and then reduce its contribution to the output current, while the digital portion, which may comprise an ideal integrator, can apply a respective current component $I_{digital}$ and, thanks to the effect of integration, at the end of a transient period, the current $I_{load}$ towards the load can chiefly be supplied, with a high degree of precision, by the digital control portion 104.

In one or more embodiments, the above digital portion can be coupled to the at least one reference-voltage source (for example, $V_{ref}N$) for controlling the reference voltage of the at least one reference-voltage source.

In one or more embodiments, this analog portion may comprise:
- a first analog control loop (for example, 102a, 1022a) sensitive (for example, 102a) to the output voltage and comprising a first reference-voltage source (for example, $V_{ref}P$) and a first current generator (for example, 1022a) for applying to the current-adder node a current (for example, $I_p$) that is a function of the difference between the output voltage and the voltage of the first reference-voltage source; and
- a second analog control loop (102b, 1022b) sensitive (for example, 102b) to the output voltage and comprising a second reference-voltage source (for example, $V_{ref}N$) and a second current generator (for example, 1022b) for applying to the current-adder node a current (for example, $I_n$) that is a function of the difference between the output voltage and the voltage of the second reference-voltage source.

In one or more embodiments, the above digital portion may be coupled to the second reference-voltage source via a control unit (for example, 1500, 1502, 1504) for controlling the reference voltage of the second reference-voltage source, the control unit being configured for reducing simultaneous activation of the first current generator and of the second current generator and/or for preventing simultaneous de-activation of the first current generator and of the second current generator, i.e., reducing superposition of operation of the generators $I_n$ and $I_p$, with the aim of reducing their simultaneous activation, preventing the condition of absence of control, with $I_n$ and $I_p$ both non-active.

In one or more embodiments, the aforesaid control unit may comprise:
- a circuit (for example, the integrator 1500) for driving the reference voltage of the second reference-voltage source; and
- a control logic (for example, 1504) sensitive to the currents of the first current generator and of the second current generator, the control logic being configured for applying to the input of the driver a signal that is a function of the deviation of the currents of the first current generator and of the second current generator from at least one threshold (for example, Th).

In one or more embodiments, the aforesaid digital integrator may comprise:
- an input gain stage (for example, 1400); and
- an accumulator (for example, 1404, 1406) cascaded to the input gain stage, the accumulator comprising an accumulation delay stage (for example, 1404).

In one or more embodiments, at least one between the gain of the one input gain stage and the delay of the accumulation delay stage may be selectively configurable (for example, CP).

In one or more embodiments, the aforesaid current source (for example, 104b) may comprise a plurality of individually activatable current sources (for example, 1040b), with the digital portion (for example, 104) that may comprise a controller (for example, 1408) of the source driven by the integrator for selectively varying the number of the activated current sources of the plurality so as to vary selectively the second current applied to the current-adder node.

In one or more embodiments, the aforesaid source controller can be configured for selectively varying the number of the activated current sources of the plurality in at least one of the following ways:
- providing a clocked activation of selected sets of the current sources of the plurality, optionally with a single elementary current source being added to/removed from the sets at each clock pulse;
- activating by turns over time all the current sources of the plurality;
- preventing continuous activation of any one of the current sources of the plurality; and
- providing over time one and the same average time of activation of the current sources of the plurality.

In one or more embodiments, an electronic device may comprise:
- at least one electrical load (for example, L); and
- a voltage-regulator circuit (for example, 100) as exemplified herein, with the current-adder output node coupled to the at least one electrical load for supplying to the load (L) a load current at a regulated output voltage.

In one or more embodiments, a method for regulating the voltage of a current-adder output node so as to supply a load with a load current at a regulated output voltage may comprise:
- detecting the output voltage and applying to the current-adder node at least one first current that is a function of the difference between the output voltage and the voltage of at least one reference-voltage source; and
- integrating in digital form the at least one first current, applying to the current-adder node a second current that is a function of the result of the digital integration, so that the at least one first current and the second current supply, on the current-adder output, the load current at the regulated output voltage.

Without prejudice to the underlying principles, the details of implementation and the embodiments may vary, even significantly, with respect to what has been illustrated herein purely by way of non-limiting example, without thereby departing from the extent of protection of the subject matter contained in the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A voltage regulator circuit, comprising:
   an output current summing node configured to be coupled to an electric load;
   an analog control loop circuit configured to provide an analog current to the output current summing node, the analog current including a positive analog current and a negative analog current; and
   a digital control loop circuit configured to provide a digital current to the output current summing node based on an integration of the analog current, the analog current and the digital current collectively forming a load current to be supplied to the electric load.

2. The voltage regulator circuit of claim 1, wherein the digital control loop circuit is further configured to control the analog control loop circuit to provide each of the positive and negative analog currents having as small a value as possible in steady-state conditions of the voltage regulator circuit.

3. The voltage regulator circuit of claim 1, wherein the analog control loop circuit is configured to generate the positive analog current based on a difference between a regulated output voltage on the output current summing node and a first reference voltage.

4. The voltage regulator circuit of claim 3, wherein the analog control loop circuit is further configured to generate the negative analog current based on a difference between a second reference voltage and the regulated output voltage, and wherein the digital control loop circuit is further configured to adjust a magnitude of the second reference voltage to control the analog control loop circuit.

5. The voltage regulator circuit of claim 4, wherein the analog control loop circuit further comprises:
   a first analog control loop including a first reference voltage source configured to generate the first reference voltage and including a first analog current generator configured to generate the positive analog current, the analog control loop configured to apply the positive analog current to the output current summing node based upon the difference between the regulated output voltage and the first reference voltage; and
   a second analog control loop including a second reference voltage source configured to generate the second reference voltage and including a second analog current generator configured to generate the negative analog current, the second analog control loop configured to apply the negative analog current to the output current summing node based upon the difference between the regulated output voltage and the second reference voltage.

6. The voltage regulator circuit of claim 5, wherein the digital control loop circuit is further configured to control the second reference voltage source to reduce simultaneous activation of the first and second analog current generators and to reduce simultaneous de-activation of the first and second analog current generators.

7. The voltage regulator circuit of claim 6, wherein the digital control loop circuit comprises a plurality of individually activatable current sources, and wherein the digital portion is further configured to adjust the number of the plurality of individually activatable current sources which are activated based upon the integration of the analog current to thereby control the digital current applied to the output current summing node.

8. The voltage regulator circuit of claim 7, wherein the digital control loop circuit is further configured to advance a sequence of activated individually activatable current sources each cycle of a clock signal to control the digital current.

9. A voltage regulator circuit, comprising:
   an output current summing node configured to be coupled to an electric load;
   an analog control loop circuit configured to provide an analog current to the output current summing node, the analog current including a positive analog current and a negative analog current and having a value based on a difference between a regulated output voltage on the output current summing node and a first reference voltage; and
   a digital control loop circuit configured to provide a digital current to the output current summing node based on an integration of the analog current, the analog current and the digital current together being a load current to be supplied to the electric load and the digital control loop circuit further configured to control the analog control loop circuit to asymptotically provide most of the load current through the digital current and to reduce values of the positive and negative analog currents.

10. The voltage regulator circuit of claim 9, wherein the digital control loop circuit wherein the digital control circuit loop is further configured to compare at least one of the positive analog current or the negative analog current to at least one threshold.

11. The voltage regulator circuit of claim 10, wherein the digital control loop circuit is further configured to maintain a current value of the first reference voltage responsive to the negative analog current exceeding a corresponding one of the at least one threshold.

12. The voltage regulator circuit of claim 9, wherein analog control loop circuit is further configured to generate the negative analog current based on a difference between a second reference voltage and the regulated output voltage, and wherein the digital control loop circuit is further configured to adjust a magnitude of the second reference voltage to control the analog control loop circuit.

13. The voltage regulator circuit of claim 12, wherein the analog control loop circuit further comprises:
   a first analog control loop including a first reference voltage source configured to generate the first reference voltage and including a first analog current generator configured to generate the positive analog current, the analog control loop configured to apply the positive analog current to the output current summing node based upon the difference between the regulated output voltage and the first reference voltage; and a second analog control loop including a second reference voltage source configured to generate the second reference voltage and including a second analog current generator configured to generate the negative analog current, the second analog control loop configured to apply the negative analog current to the output current summing node based upon the difference between the regulated output voltage and the second reference voltage.

14. The voltage regulator circuit of claim 13, wherein the digital control loop circuit is further configured to control the second reference voltage source to reduce simultaneous activation of the first and second analog current generators and to reduce simultaneous de-activation of the first and second analog current generators.

15. The voltage regulator circuit of claim 14, wherein the digital control loop circuit comprises a plurality of individually activatable current sources, and wherein the digital portion is further configured to adjust the number of the plurality of individually activatable current sources which are activated based upon the integration of the analog current to thereby control the digital current applied to the output current summing node.

16. The voltage regulator circuit of claim 15, wherein the digital control loop circuit is further configured to advance a sequence of activated individually activatable current sources each cycle of a clock signal to control the digital current.

17. A method, comprising:
detecting a regulated output voltage on an output node;
generating at least one reference voltage;
providing to the output node an analog current including a positive analog current and negative analog current;
digitally integrating the analog current;
providing a digital current to the output node based on the integrating of the analog current; and
providing on the output node a load current equal to the sum of the digital current and the analog current.

18. The method of claim 17 further comprises reducing values of the positive and negative analog currents in steady-state conditions.

19. The method of claim 17, wherein generating at least one reference voltage comprises generating a positive reference voltage and a negative reference voltage.

20. The method of claim 19, wherein generating the negative reference voltage comprises generating the negative reference voltage based upon the integration of the analog current.

21. The voltage regulator circuit of claim 1, wherein the digital control loop circuit includes:
an analog to digital converter circuit configured to converted the analog current to a converted digital current; and
a digital integrator configured to integrate the converted digital current to produce an integrated digital current, wherein the digital control loop circuit is configured to provide the digital current to the output current summing node based on the integrated digital current.

* * * * *